(12) United States Patent
Lee et al.

(10) Patent No.: US 12,725,022 B2
(45) Date of Patent: Sep. 1, 2026

(54) ITERATIVE REDUCTION OF QUANTIZATION ERROR IN NEURAL NETWORK MODEL

(71) Applicant: SAMSUNG ELECTRONICS CO., LTD., Suwon-si (KR)

(72) Inventors: Sangjeong Lee, Suwon-si (KR); Jihun Oh, Suwon-si (KR); Meejeong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 915 days.

(21) Appl. No.: 17/893,450

(22) Filed: Aug. 23, 2022

(65) Prior Publication Data

US 2022/0405561 A1 Dec. 22, 2022

Related U.S. Application Data

(63) Continuation of application No. PCT/KR2022/008456, filed on Jun. 15, 2022.

(30) Foreign Application Priority Data

Jun. 25, 2021 (KR) ........................ 10-2021-0083107

(51) Int. Cl.
*G06N 3/063* (2023.01)
*G06F 5/01* (2006.01)

(52) U.S. Cl.
CPC ............. *G06N 3/063* (2013.01); *G06F 5/012* (2013.01)

(58) Field of Classification Search
CPC ...... G06N 3/063; G06N 3/0495; G06N 3/084; G06F 5/012; G06F 7/49947
See application file for complete search history.

(56) References Cited

U.S. PATENT DOCUMENTS

| | | | |
|---|---|---|---|
| 10,474,430 | B2 | 11/2019 | Diril et al. |
| 10,853,067 | B2 | 12/2020 | Henry et al. |

(Continued)

FOREIGN PATENT DOCUMENTS

| | | |
|---|---|---|
| CN | 108288087 A | 7/2018 |
| JP | 2021-43905 A | 3/2021 |

(Continued)

OTHER PUBLICATIONS

Lee, Dongsoo, and Byeongwook Kim. “Retraining-based iterative weight quantization for deep neural networks.” 32nd Annual Conference on Neural Information Processing Systems, arXiv:1805.11233 (2018). (Year: 2018).*

(Continued)

*Primary Examiner* — Kakali Chaki
*Assistant Examiner* — Jesse Chen Coulson
(74) *Attorney, Agent, or Firm* — Sughrue Mion, PLLC

(57) ABSTRACT

An electronic device and a controlling method of an electronic device are provided. An electronic device recursively determines a plurality of layers of a neural network model. Weight data of first model information is recursively quantized to obtain a second neural network model. The recursive quantization begins with the weight data and determines an iteration count of a recursion. The recursion operates on error data, quantized weight data, scale data and quantized error data to obtain the iteration count. A first bit-width of the weight data is reduced to a second bit-width of the quantized weight data. The recursion may be performed on a per-layer basis. The weight data may be formulated in a floating-point format and the quantized weight data may be formulated in a fixed point format with an integer number of bits.

11 Claims, 9 Drawing Sheets

(56) References Cited

U.S. PATENT DOCUMENTS 11,392,825 B2 7/2022 Ji et al.
11,418,215 B2 8/2022 Kim et al.
11,625,577 B2 4/2023 Lee et al.
11,748,615 B1 * 9/2023 Wu .......................... G06N 3/08 706/25
2017/0308789 A1 10/2017 Langford et al.
2020/0193273 A1 6/2020 Chung et al.
2020/0193274 A1 6/2020 Darvish Rouhani et al.
2020/0218962 A1 7/2020 Lee et al.
2020/0226444 A1 7/2020 Sharma et al.
2020/0226473 A1 7/2020 Sharma et al.
2020/0234112 A1 7/2020 Wang et al.
2020/0302283 A1 9/2020 Zhu et al.
2020/0394523 A1 * 12/2020 Liu ......................... G06F 17/18
2021/0081802 A1 3/2021 Sakai
2021/0089898 A1 3/2021 Park et al.
2021/0192349 A1 6/2021 Lian et al.
2021/0193120 A1 6/2021 Matuso
2021/0211141 A1 7/2021 Kim et al.
2023/0206031 A1 6/2023 Lee et al.

FOREIGN PATENT DOCUMENTS

KR 10-2020-0086581 A 7/2020
KR 10-2021-0023912 A 3/2021
KR 10-2021-0035702 A 4/2021
KR 10-2021-0089487 A 7/2021
WO 2020/131390 A1 6/2020
WO 2020/190526 A1 9/2020
WO 2020/258071 A1 12/2020

OTHER PUBLICATIONS

Yang et al., "FracBits: Mixed Precision Quantization via Fractional Bit-Widths", The Thirty-Fifth AAAI Conference on Artificial Intelligence (AAAI-21), 2021, (9 total pages).

Umuroglu et al., "BISMO: A Scalable Bit-Serial Matrix Multiplication Overlay for Reconfigurable Computing", arXiv:1806.08862v1 [cs.AR] Jun. 22, 2018, https://www.researchgate.net/publication/325986678, (9 total pages).

Lin, "Mixed-Precision NN Accelerator with Neural-Hardware Architecture Search", Massachusetts Institute of Technology, May 15, 2020, (65 pages total).

Xu et al., "Alternating Multi-Bit Quantization for Recurrent Neural Networks", Published as a conference paper at ICLR 2018, (13 pages total).

International Search Report (PCT/ISA/210) dated Sep. 21, 2022 issued by the Int. Searching Authority in App No. PCT/KR2022/008456.

International Written Opinion (PCT/ISA/237) dated Sep. 21, 2022 issued by the Int. Searching Authority in App No. PCT/KR2022/008456.

Sanghyun Seo et al., "Efficient Weights Quantization of Convolutional Neural Networks Using Kernel Density Estimation based Non-uniform Quantizer", applied sciences, 2019, 13 Pages Total.

* cited by examiner

ITERATIVE REDUCTION OF QUANTIZATION ERROR IN NEURAL NETWORK MODEL

CROSS-REFERENCE TO RELATED APPLICATIONS

This application is a continuation of International Application No. PCT/KR2022/008456 designating the United States, filed on Jun. 15, 2022, in the Korean Intellectual Property Receiving Office and claiming priority to Korean Patent Application No. 10-2021-0083107, filed on Jun. 25, 2021, in the Korean Intellectual Property Receiving Office, the disclosures of all of which are incorporated by reference herein in their entireties.

BACKGROUND

Field

Apparatuses and methods consistent with the disclosure relate to an electronic device and a controlling method of the electronic device, and more particularly, to an electronic device capable of performing recursive quantization on weight data of a neural network model and a controlling method of the electronic device.

Description of the Related Art

In recent years, technologies for light-weighting neural network models have been developed, and these techniques are further developed, particularly, as attempts to efficiently implement the neural network models in an on-device form continue. In particular, in the case of a technology for quantizing weight data of a neural network model expressed in units of high precision into weight data of relatively low precision, maintaining the level of precision required for a neural network model while improving computational efficiency is emerging as a major challenge.

For example, when real weight data expressed in a 32-bit floating point (FP32) method is quantized and converted into integer weight data expressed in 8 bits, a quantization error may occur between the weight data before and after quantization, which may lead to a decrease in the precision of the neural network model. That is, a specific layer of the neural network model may represent sufficient precision based on the integer weight data expressed in 8 bits, but it may be difficult for other layers to represent sufficient precision based on the integer weight data expressed in 8 bits. Accordingly, there is a need for a technology for quantizing weight data in consideration of the precision of each layer included in the neural network model.

Meanwhile, as a prior art technology for quantization of weight data, there is a technology for performing quantization on weight data and an operation according to a neural network model based on single precision. However, according to the single precision-based technology, it is possible to reduce a quantization error by giving a bit-width of a sufficient degree to all layers of the neural network model (that is, in the above example, all layers are treated in 16 bits), but according to this, the amount of computation is greatly increased, and there may be a limit to optimization in terms of memory resources.

On the other hand, because a technique of performing quantization on weight data and an operation according to a neural network model based on mixed-precision as a prior art performs the quantization and operation based on an optimal bit-width for each layer of the neural network model, hardware resources may be minimized, but there is a limit in that a adding additional hardware supporting the mixed-precision increases overhead.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides an electronic device that may exhibit the same effect as supporting mixed-precision even in hardware supporting single precision in quantization of weight data, and a controlling method of the electronic device.

According to an embodiment of the disclosure, an electronic device includes: a memory configured to store first model information including information on a plurality of layers of a neural network model and first weight data expressed in a real number of a first bit-width; and a processor configured to perform recursive quantization including quantization on the first weight data and quantization on error data, wherein the processor is configured to: identify an iteration count of quantization for the error data for each of the plurality of layers, based on the first model information, acquire quantization information including second weight data corresponding to each of the first weight data and expressed in an integer of a second bit-width smaller than the first bit by performing the recursive quantization according to the identified iteration count, and acquire second model information on a reconfigured neural network model by reconfiguring the neural network model based on the first model information, information on the identified iteration count, and information on the second weight data.

The processor may be configured to: acquire temporary weight data expressed in the real number of the first bit-width by performing recursive quantization on the first weight data according to an iteration count value to an initial value, acquire a first loss value by performing a feedforward process of the neural network model based on the temporary weight data, acquire a second loss value for latency of hardware by performing a simulation on the hardware for driving the neural network model based on the temporary weight data, and identify the iteration count by updating the iteration count value such that a third loss value in which the first loss value and the second loss value are combined is decreased.

The processor may be configured to: acquire first temporary weight data expressed in the real number of the first bit-width by performing first quantization including quantization and inverse quantization on the first weight data expressed in the real number of the first bit-width, acquire first error data expressed in the real number of the first bit-width based on first weight data and the first temporary weight data expressed in the real number of the first bit-width, acquire error data expressed in the integer of the second bit-width by performing second quantization including quantization and inverse quantization on the first error data expressed in the real number of the first bit-width, and determine, as the temporary weight data, second temporary weight data to which the results of the first quantization and the second quantization are reflected by summing the first temporary weight data, the first error data, and the second error data.

The processor may be configured to: acquire third temporary weight data expressed in the real number of the first bit-width by performing recursive quantization on the first weight data according to a first iteration count value acquired by rounding down the iteration count value, and acquire fourth temporary weight data expressed in the real number of the first bit-width by performing recursive quantization on the first weight data according to a second iteration count value acquired by rounding up the iteration count value, when the iteration count value is not an integer, interpolate weights corresponding to each other among the third temporary weight data and the fourth temporary weight data, and determine temporary weight data acquired according to a result of the interpolation as the second temporary weight data.

The processor may be configured to: acquire temporary weight data expressed in the real number of the first bit-width by performing recursive quantization on the first weight data according to the identified iteration count, acquire a loss value by performing a feedforward process of the neural network model based on the temporary weight data, and acquire the second weight data by updating the first weight data so that the loss value is reduced.

The quantization information may include information on the second weight data, first scale information corresponding to the second weight data, information on the error data corresponding to the second weight data, and second scale information corresponding to the error data, and the processor may be configured to acquire the second model information by: combining a plurality of second operators for reflecting the error data to a first operator included in the plurality of layers according to the identified iteration count, allocating the information on the second weight data and the first scale information to the first operator, and allocating the information on the error data and the second scale information to the plurality of second operators.

The first weight data may be implemented through a zero-sum filter having a characteristic that a total sum of weight values constituting the filter becomes 0, and when the recursive quantization is performed according to the identified iteration count, an error value corresponding to each of the weight values may be reflected to a quantization result of each of the weight values, such that the total sum of the weight values constituting the zero-sum filter may converge 0.

According to another embodiment of the disclosure, a controlling method of an electronic device includes: identifying an iteration count of quantization for error data for each of a plurality of layers, based on first model information including information on the plurality of layers of a neural network model and first weight data expressed in a real number of a first bit-width; acquiring quantization information including second weight data corresponding to each of the first weight data and expressed in an integer of a second bit-width smaller than the first bit by performing the recursive quantization according to the identified iteration count; and acquiring second model information on a reconfigured neural network model by reconfiguring the neural network model based on the first model information, information on the identified iteration count, and information on the second weight data.

The identifying of the iteration count may include: acquiring temporary weight data expressed in the real number of the first bit-width by performing recursive quantization on the first weight data according to an iteration count value to an initial value; acquiring a first loss value by performing a feedforward process of the neural network model based on the temporary weight data; acquiring a second loss value for latency of hardware by performing a simulation on the hardware for driving the neural network model based on the temporary weight data; and identifying the iteration count by updating the iteration count value such that a third loss value in which the first loss value and the second loss value are combined is decreased.

The acquiring of the temporary weight data may include: acquiring first temporary weight data expressed in the real number of the first bit-width by performing first quantization including quantization and inverse quantization on the first weight data expressed in the real number of the first bit-width, acquiring first error data expressed in the real number of the first bit-width based on first weight data and the first temporary weight data expressed in the real number of the first bit-width, acquiring error data expressed in the integer of the second bit-width by performing second quantization including quantization and inverse quantization on the first error data expressed in the real number of the first bit-width, and determining, as the temporary weight data, second temporary weight data to which the results of the first quantization and the second quantization are reflected by summing the first temporary weight data, the first error data, and the second error data.

The controlling method may further include: acquiring third temporary weight data expressed in the real number of the first bit-width by performing recursive quantization on the first weight data according to a first iteration count value acquired by rounding down the iteration count value, and acquiring fourth temporary weight data expressed in the real number of the first bit-width by performing recursive quantization on the first weight data according to a second iteration count value acquired by rounding up the iteration count value, when the iteration count value is not an integer; interpolating weights corresponding to each other among the third temporary weight data and the fourth temporary weight data; and determining temporary weight data acquired according to a result of the interpolation as the second temporary weight data.

The acquiring of the quantization information may include: acquiring temporary weight data expressed in the real number of the first bit-width by performing recursive quantization on the first weight data according to the identified iteration count, acquiring a loss value by performing a feedforward process of the neural network model based on the temporary weight data, and acquiring the second weight data by updating the first weight data so that the loss value is reduced.

The quantization information may include information on the second weight data, first scale information corresponding to the second weight data, information on the error data corresponding to the second weight data, and second scale information corresponding to the error data, and in the acquiring of the second model information, the second model information may be acquired by: combining a plurality of second operators for reflecting the error data to a first operator included in the plurality of layers according to the identified iteration count, allocating the information on the second weight data and the first scale information to the first operator, and allocating the information on the error data and the second scale information to the plurality of second operators.

The first weight data may be implemented through a zero-sum filter having a characteristic that a total sum of weight values constituting the filter becomes 0, and when the recursive quantization is performed according to the identified iteration count, an error value corresponding to each of the weight values may be reflected to a quantization result of each of the weight values, such that the total sum of the weight values constituting the zero-sum filter may converge 0.

According to still another embodiment of the disclosure, a non-transitory computer readable recording medium including a program for executing a controlling method of an electronic device, wherein the controlling method of the electronic device includes: identifying an iteration count of quantization for error data for each of a plurality of layers, based on first model information including information on the plurality of layers of a neural network model and first weight data expressed in a real number of a first bit-width; acquiring quantization information including second weight data corresponding to each of the first weight data and expressed in an integer of a second bit-width smaller than the first bit by performing the recursive quantization according to the identified iteration count; and acquiring second model information on a reconfigured neural network model by reconfiguring the neural network model based on the first model information, information on the identified iteration count, and information on the second weight data.

Also disclosed herein is an electronic device including a memory configured to store first model information including information on a plurality of layers of a neural network model and first weight data expressed in a first bit-width; and a processor configured to: identify an iteration count of quantization of error data for each layer of the plurality of layers, based on the first model information, acquire quantization information including second weight data corresponding to each of the first weight data and expressed in an integer of a second bit-width smaller than the first bit-width by performing recursive quantization according to the iteration count, and acquire second model information on a reconfigured neural network model by reconfiguring the neural network model based on the first model information, the iteration count, and the second weight data.

In some embodiments, the processor is further configured to: acquire temporary weight data expressed in the first bit-width by performing the recursive quantization on the first weight data according to an initial iteration count, acquire a first loss value by performing a feedforward process of the neural network model based on the temporary weight data, acquire a second loss value for latency of hardware by performing a simulation on the hardware for driving the neural network model based on the temporary weight data, and identify the iteration count by updating a current iteration count such that a third loss value is decreased, wherein the third loss value is a combination of the first loss value and the second loss value.

In some embodiments, the processor is further configured to: acquire first temporary weight data expressed in the first bit-width by performing first quantization including a quantization and an inverse quantization of the first weight data expressed in the first bit-width, acquire first error data expressed in the first bit-width based on the first weight data and the first temporary weight data expressed in the first bit-width, acquire second error data expressed in the second bit-width by performing second quantization including a quantization and an inverse quantization of the first error data expressed in the first bit-width, and determine, as the temporary weight data, second temporary weight data by summing the first temporary weight data, the first error data, and the second error data.

In some embodiments, the processor is further configured to: acquire third temporary weight data expressed in the first bit-width by performing the recursive quantization on the first weight data according to a first iteration count value acquired by rounding down the current iteration count, and acquire fourth temporary weight data expressed in the first bit-width by performing the recursive quantization on the first weight data according to a second iteration count acquired by rounding up the current iteration count, when the current iteration count is not an integer, interpolate weights corresponding to each other among the third temporary weight data and the fourth temporary weight data, and determine temporary weight data acquired according to a result of the interpolation as the second temporary weight data.

In some embodiments, the processor is further configured to: acquire temporary weight data expressed in the first bit-width by performing the recursive quantization on the first weight data according to the iteration count, acquire a loss value by performing a feedforward process of the neural network model based on the temporary weight data, and acquire the second weight data by updating the first weight data so that the loss value is reduced.

In some embodiments, the quantization information includes first information on the second weight data, first scale information corresponding to the second weight data, second information on second error data corresponding to the second weight data, and second scale information corresponding to the second error data, and the processor is further configured to acquire the second model information by: allocating the information on the second weight data and the first scale information to a first operator, and allocating the information on the second error data and the second scale information to a plurality of second operators.

In some embodiments, the first weight data is implemented through a zero-sum filter having a characteristic that a total sum of first weight values constituting the zero-sum filter is 0, and when the recursive quantization is performed according to the iteration count, an error value corresponding to each of the first weight values is reflected to a quantization result of each of the first weight values, such that the total sum converges to 0.

Also disclosed herein is a controlling method of an electronic device, the controlling method including: identifying an iteration count of quantization for error data for each of a plurality of layers, based on first model information including information on the plurality of layers of a neural network model and first weight data expressed in a first bit-width; acquiring quantization information including second weight data corresponding to each of the first weight data and expressed in a second bit-width smaller than the first bit-width by performing recursive quantization according to the iteration count; and acquiring second model information on a reconfigured neural network model by reconfiguring the neural network model based on the first model information, the iteration count, and the second weight data.

In some embodiments the identifying of the iteration count includes: acquiring temporary weight data expressed in the first bit-width by performing the recursive quantization on the first weight data according to an initial iteration count; acquiring a first loss value by performing a feedforward process of the neural network model based on the temporary weight data; acquiring a second loss value for latency of hardware by performing a simulation on the hardware for driving the neural network model based on the temporary weight data; and identifying the iteration count by updating a current iteration count such that a third loss value is decreased, wherein the third loss value is a combination of the first loss value and the second loss value.

In some embodiments, the acquiring of the temporary weight data includes: acquiring first temporary weight data expressed in the first bit-width by performing first quantization including a quantization and an inverse quantization of the first weight data expressed in the first bit-width, acquiring first error data expressed in the first bit-width based on the first weight data and the first temporary weight data expressed in the first bit-width, acquiring second error data expressed in the second bit-width by performing second quantization including a quantization and an inverse quantization of the first error data expressed in the first bit-width, and determining, as the temporary weight data, second temporary weight data by summing the first temporary weight data, the first error data, and the second error data.

In some embodiments, the controlling method includes acquiring third temporary weight data expressed in the first bit-width by performing the recursive quantization on the first weight data according to a first iteration count acquired by rounding down the current iteration count, and acquiring fourth temporary weight data expressed in the first bit-width by performing the recursive quantization on the first weight data according to a second iteration count acquired by rounding up the current iteration count, when the iteration count is not an integer; interpolating weights corresponding to each other among the third temporary weight data and the fourth temporary weight data; and determining temporary weight data acquired according to a result of the interpolation as the second temporary weight data.

In some embodiments of the controlling method, acquiring quantization information further includes: acquiring temporary weight data expressed in the first bit-width by performing the recursive quantization on the first weight data according to the iteration count, acquiring a loss value by performing a feedforward process of the neural network model based on the temporary weight data, and acquiring the second weight data by updating the first weight data so that the loss value is reduced.

In some embodiments the quantization information includes first information on the second weight data, first scale information corresponding to the second weight data, second information on second error data corresponding to the second weight data, and second scale information corresponding to the error data, and the acquiring of the second model information further includes: allocating the information on the second weight data and the first scale information to a first operator, and allocating the information on the second error data and the second scale information to a plurality of second operators.

In some embodiments the first weight data is implemented through a zero-sum filter having a characteristic that a total sum of first weight values constituting the zero-sum filter becomes 0, and when the recursive quantization is performed according to the iteration count, an error value corresponding to each of the first weight values is reflected to a quantization result of each of the first weight values, such that the total sum converges to 0.

Also disclosed herein is a non-transitory computer readable recording medium including a program for executing a controlling method of an electronic device, wherein the controlling method of the electronic device includes: identifying an iteration count of quantization for error data for each of a plurality of layers, based on first model information including information on the plurality of layers of a neural network model and first weight data expressed in a first bit-width; acquiring quantization information including second weight data corresponding to each of the first weight data and expressed in a second bit-width smaller than the first bit-width by performing recursive quantization according to the iteration count; and acquiring second model information on a reconfigured neural network model by reconfiguring the neural network model based on the first model information, the iteration count, and the second weight data.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
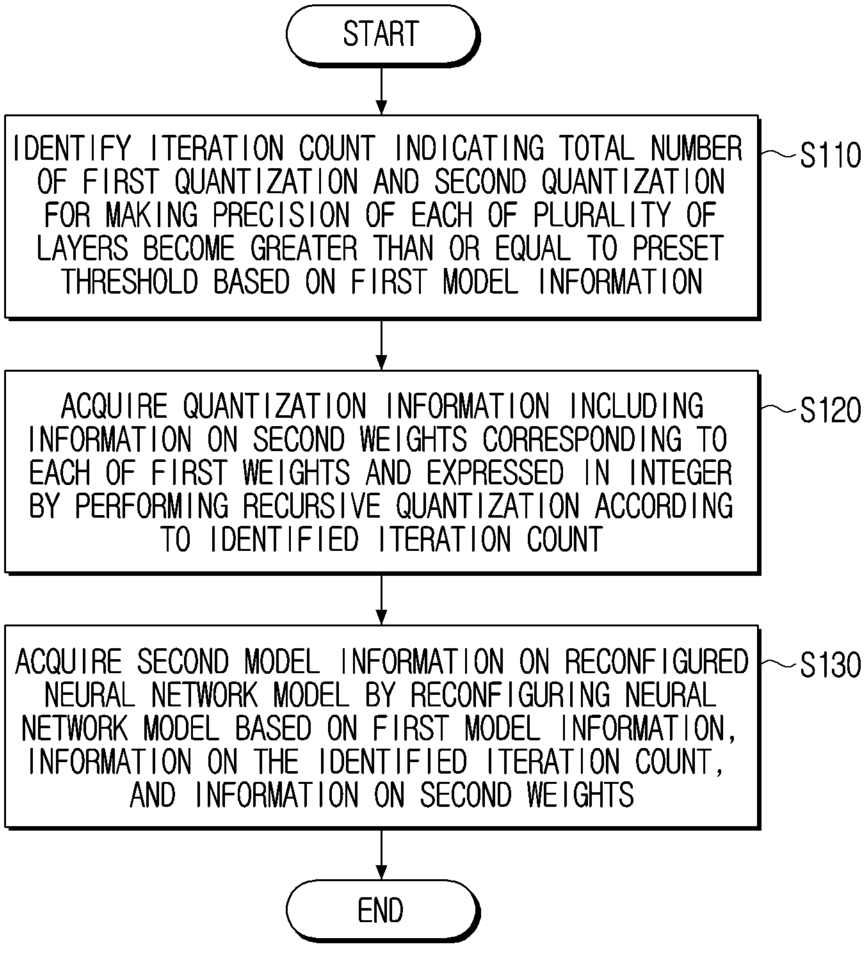
FIG. 1 is a flowchart illustrating a controlling method of an electronic device according to an embodiment of the disclosure.

Because the embodiments may be variously modified and have several embodiments, specific embodiments will be illustrated in the drawings and described in detail in the detailed description. However, it is to be understood that it is not intended to limit the scope to the specific embodiment, but includes various modifications, equivalents, and/or alternatives according to the embodiments of the disclosure. In connection with the description of the drawings, similar reference numerals may be used for similar components.

In describing the disclosure, when it is decided that a detailed description for the known functions or configurations related to the disclosure may unnecessarily obscure the gist of the disclosure, the detailed description thereof will be omitted.

In addition, the following embodiments may be modified to several different forms, and the scope and spirit of the disclosure are not limited to the following embodiments. Rather, these embodiments make the disclosure thorough and complete, and are provided in order to completely transfer the technical spirit of the disclosure to those skilled in the art.

Terms used in the disclosure are used only to describe specific embodiments and are not intended to be limiting of the scope. Singular expressions include plural expressions unless the context clearly indicates otherwise.

In the disclosure, an expression “have”, “may have”, “include”, “may include”, or the like, indicates an existence of a corresponding feature (for example, a numerical value, a function, an operation, a component such as a part, or the like), and does not exclude an existence of an additional feature.

In the disclosure, an expression “A or B”, “at least one of A and/or B”, “one or more of A and/or B”, or the like, may include all possible combinations of items listed together. For example, “A or B”, “at least one of A and B”, or “at least one of A or B” may refer to all cases (1) including at least one A, (2) including at least one B, or (3) including both at least one A and at least one B.

Expressions “first”, “second”, and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component).

On the other hand, when it is mentioned that any component (e.g., a first component) is “directly coupled with/to” or “directly connected to” to another component (e.g., a second component), it is to be understood that another component (e.g., a third component) is not present between any component and another component.

An expression “configured (or set) to” used in the disclosure may be replaced by an expression “suitable for”, “having the capacity to”, “designed to”, “adapted to”, “made to”, or “capable of” depending on a situation. A term “configured (or set) to” may not necessarily mean only “specifically designed to” in hardware.

Instead, in any context, an expression “a device configured to” may mean that the device is “capable of” together with other devices or components. For example, a “processor configured (or set) to perform A, B, and C” may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

In the embodiments, a ‘module’ or a ‘—er/or’ may perform at least one function or operation, and be implemented as hardware or software or be implemented as a combination of hardware and software. In addition, a plurality of ‘modules’ or a plurality of ‘—ers/ors’ may be integrated in at least one module and be implemented as at least one processor except for a ‘module’ or an ‘—er/or’ that needs to be implemented as specific hardware.

On the other hand, various elements and regions in the drawings are schematically illustrated. Therefore, the technical spirit of the disclosure is not limited by relatively sizes or intervals illustrated in the accompanying drawings.

Hereinafter, embodiments of the disclosure will be described in detail with reference to the accompanying drawings so that those skilled in the art to which the disclosure pertains may easily practice the disclosure.

FIG. 1 is a flowchart illustrating a controlling method of an electronic device according to an embodiment of the disclosure. Hereinafter, key terms for describing the disclosure will be first described, and then, each step of a controlling method according to an embodiment of the disclosure will be described with reference to FIG. 1.

An “electronic device” according to the disclosure refers to a device configured to perform a process of quantizing weight data of a neural network model and reconfiguring the neural network model. Specifically, the electronic device may perform quantization on weight data constituting the neural network model, and may reconstruct the neural network model based on the quantized weight data. For example, the electronic device may be implemented as a smartphone, a tablet PC, or the like, but the type of the electronic device according to the disclosure is not particularly limited. Hereinafter, the electronic device according to the disclosure will be briefly referred to as an “electronic device 100”.

A “neural network model” according to the disclosure refers to an artificial intelligence model including a neural network, and may be learned by deep learning. The neural network model may be of a type such as an object recognition model, an automatic speech recognition model, and a speech synthesis model, but the neural network model according to the disclosure is not limited to the above-described examples.

The type of neural network included in the neural network model according to the disclosure is also not limited to a specific type. That is, the neural network model according to the disclosure may include various types of neural networks, such as Deep Neural Network (DNN), Convolution Neural Network (CNN), Recurrent Neural Network (RNN), and Generative Adversarial Networks (GAN). In addition, the neural network model according to the disclosure may be implemented in the form of an on-device included in the electronic device 100, and may also be included in an external device connected to the electronic device 100.

“Quantization on weight data” refers to a process of converting weight data expressed in units of high precision into weight data of relatively low precision. In particular, quantization on weight data according to the disclosure refers to a process of converting weight data expressed by a real number in a first bit-width into weight data expressed in an integer of a second bit-width smaller than the first bit. For example, when the quantization on weight data is performed, real weight data expressed in a 32-bit floating point (FP32) method may be converted into integer weight data expressed in 8 bits or 16 bits. The 32-bit floating point method of representation may correspond to a first bit-width and the integer weight data may be correspond to a second bit-width. Because floating point includes an exponent and a mantissa, the first bit-width may be referred to as expressing a value in a real number of the first bit-width. Because integer weight data might not include an exponent, the second bit-width may be referred to as expressing a value in an integer number of the second bit-width.

The term “reconfiguration of a neural network model” is a generic term for a process of acquiring information about a new neural network model based on the quantized weight data. Specifically, the electronic device 100 according to the disclosure may acquire information on a new neural network model by changing a structure of the neural network model and parameters of each layer included in the neural network model through the model reconfiguration process. In describing the disclosure, the term "first model information" is used as a generic term for information about the neural network model before performing the model reconfiguration process, and the term "second model information" is used as a generic term for information on a neural network model reconfigured as the model reconfiguration process is performed.

The "weight data" may include a plurality of weights and may be expressed in one of a vector, a matrix, or a tensor. Hereinafter, in describing the disclosure, weight data expressed in a real range of a first bit-width, which is weight data before quantization is performed, is referred to as "first weight data", and weight data expressed in an integer of a second bit-width, which is weight data quantized as quantization is performed, is referred to as "second weight data". In particular, the term second weight data refers to weight data finally acquired as a result of performing the quantization process according to the disclosure, and is used as a meaning distinct from temporary weight data temporarily acquired during the quantization process.

In particular, the electronic device 100 according to the disclosure may perform a quantization process that may be referred to as "recursive quantization". The recursive quantization may include quantization for first weight data and quantization for error data. Specifically, when quantization is performed on the first weight data, an error may occur between the quantized weight data and the first weight data. Hereinafter, data representing a difference between weights corresponding to each other in the first weight data and the quantized weight data is referred to as "error data". The error data may be referred to as a term such as "quantized error". In addition, the "error data" may include a plurality of error values and may be expressed in one of a vector, a matrix, or a tensor.

Referring to FIG. 1, the electronic device 100 according to the disclosure may identify an iteration count of quantization for error data for each of a plurality of layers included in a neural network model based on first model information (S110). Specifically, the electronic device 100 may identify the iteration count of quantization for error data that may acquire optimal quantized weight data for each of the plurality of layers, based on information on the plurality of layers of the neural network model and first weight data expressed in a real number of a first bit-width included in the first model information.

The "iteration count" refers to a measure indicating how many times to perform quantization on the error data generated according to a result of quantization on the weight data. The term "iteration count" may be referred to as a "recursion time" in that the quantization method according to the disclosure is according to a recursive algorithm. The quantization on the weight data according to the disclosure may be performed once, and the quantization on the error data may be performed one or more times according to the iteration count. That is, the iteration count may be expressed in a natural number greater than 1.

Specifically, the electronic device 100 may acquire temporary weight data expressed in a real number of the first bit-width by performing the recursive quantization on the first weight data according to the iteration count set to an initial value. The term "temporary weight data" is a generic term for weight data calculated in a process of quantizing the first weight data until finally acquiring second weight data.

Meanwhile, as described above, because the recursive quantization includes quantization for first weight data and quantization for error data, each of the quantization on the first weight data and the quantization on the error data may be performed according to a fake quantization technique in which inverse quantization (dequantization) is performed again after quantization. A fake quantization process performed within the process of first quantization, second quantization, and third quantization will be described in more detail with reference to FIG. 2.

When the temporary weight data is acquired, the electronic device 100 may acquire a first loss value by performing a feedforward process of the neural network model based on the temporary weight data. That is, the electronic device 100 may acquire output data corresponding to the input data based on the temporary weight data by inputting the input data included in training data to the neural network model, and may acquire the first loss value based on a difference between the acquired output data and correct answer data included in the training data.

Meanwhile, the electronic device 100 may acquire a second loss value for latency of hardware by performing a simulation on hardware for driving the neural network model based on the temporary weight data. Specifically, the electronic device 100 may acquire information on latency corresponding to a set resource of hardware and a second loss value accordingly by setting the resource of hardware for driving the neural network model and simulating the operation of the neural network model based on the acquired temporary weight data.

When the first loss value and the second loss value are acquired, the electronic device 100 may identify the iteration count by updating the iteration count value so that a third loss value in which the first loss value and the second loss value are combined is decreased. Specifically, the electronic device 100 may update the iteration count value according to a gradient descent method for reducing a gradient of an activation function for each layer by performing a back propagation process based on the third loss value. When the iteration count value is updated enough to converge to a specific value, the electronic device 100 may round up the updated iteration count value, and may determine a natural number according to a rounding result as the iteration count for performing the recursive quantization according to the disclosure.

Specifically, because precision of the temporary weight data increases as the iteration count value according to the disclosure increases, the first loss value according to the feedforward process decreases, but on the other hand, because more hardware resources are required as the iteration count value increases, the second loss value according to the simulation process increases. This is because computational efficiency of the neural network model using the quantized weight data has a trade-off relationship with the precision of the output value for each layer included in the neural network model. After all, the process of updating the iteration count value so that the third loss value in which the first loss value and the second loss value are combined is reduced according to the disclosure may be referred to as a process of determining an optimal iteration count in consideration of both the precision of weight data and the latency of hardware.

Meanwhile, the process of identifying the iteration count as described above may be performed for each of the plurality of layers included in the neural network model. That is, because an optimal bit-width for acquiring an output value of high precision while achieving high computational efficiency is different for each of the plurality of layers included in the neural network model, the electronic device 100 may identify the iteration count of quantization for error data for each of the plurality of layers, and the following process performed according to the identified iteration count may also be performed for each of the plurality of layers.

When the iteration count for each of the plurality of layers is identified, the electronic device 100 may acquire quantization information including second weight data corresponding to each of the first weight data and expressed in an integer of a second bit-width smaller than the first bit by performing the recursive quantization according to the identified iteration count (S120).

Here, the "quantization information" is a generic term for information acquired as a result of performing the recursive quantization according to the disclosure. In particular, the quantization information may include information on the second weight data, first scale information corresponding to the second weight data, information on error data corresponding to the second weight data, and second scale information corresponding to the error data. A method of reconfiguring a neural network model based on the information on the second weight data, the first scale information, the information on the error data corresponding to the second weight data, and the second scale information will be described in detail with reference to FIG. 4, and hereinafter, a method of acquiring the second weight data will be mainly described.

Specifically, the electronic device 100 may acquire temporary weight data expressed in a real number of the first bit-width by performing the recursive quantization on the first weight data according to the identified iteration count. When the temporary weight data is acquired, the electronic device 100 may acquire a fourth loss value by performing a feedforward process of the neural network model based on the temporary weight data. When the fourth loss value is acquired, the electronic device 100 may acquire the second weight data by updating the first weight data so that the fourth loss value is decreased.

Here, the recursive quantization being performed according to the identified iteration count means that quantization of the error data is repeatedly performed by the identified iteration count after quantization is performed on the first weight data once. For example, when the identified iteration count is three, the electronic device 100 may perform the quantization on the first weight data once and then perform the quantization on the error data twice.

On the other hand, a detailed process of recursive quantization according to S120 may also be performed according to a fake quantization technique that performs inverse quantization again after quantization like the recursive quantization in S110, which will be described in more detail with reference to FIG. 3.

When the fourth loss value is acquired as described above, the electronic device 100 may perform the same back propagation process as the process of updating the iteration count value. That is, the electronic device 100 may update the first weight data according to the gradient descent method of reducing the gradient of the activation function for each layer by performing a back propagation process based on the fourth loss value. In addition, when the weights included in the first weight data are updated enough to converge, the electronic device 100 may round up the updated weights, accordingly acquire weights expressed in an integer of the second bit-width, and acquire second weight data including the acquired weights.

When the quantization information is acquired, the electronic device 100 may acquire second model information on a reconfigured neural network model by reconfiguring the neural network model based on the first model information, the information on the identified iteration count, and the quantization information (S130).

As described above, the first model information may include information on the plurality of layers of the neural network model and the first weight data. In addition, the information on the plurality of layers may include information on the structure of the plurality of layers and information on at least one operator included in each of the plurality of layers.

Meanwhile, as described above, the quantization information may include information on the second weight data, first scale information corresponding to the second weight data, information on error data corresponding to the second weight data, and second scale information corresponding to the error data.

The electronic device 100 may combine a plurality of second operators for reflecting the error data to a first operator included in the plurality of layers by the identified iteration count based on information on the structure of the plurality of layers and information on at least one operator included in each of the plurality of layers. For example, when the identified iteration count is two, the electronic device 100 may add one second operator to the first operator for performing an operation between the input data and the weight data, and may change a configuration of a specific layer to sum up an operation result according to the first operator and an operation result according to the second operator.

When the plurality of second operators are combined with the first operator, the electronic device 100 may allocate the information on the second weight data and the first scale information to the first operator, and allocate the information on the error data and the second scale information to the plurality of second operators. Accordingly, the electronic device 100 may acquire second model information, which is information on the reconfigured neural network model. A process of acquiring second model information by reconfiguring a neural network model will be described in more detail with reference to FIG. 4.

When the second model information is acquired as described above, the electronic device 100 may acquire output data for input data by using the neural network model reconfigured in the process of acquiring the second model information. In addition, the electronic device 100 may transmit the acquired second model information to an external device including a server, an edge computing device, and the like, and thus may use the neural network model reconfigured in the external device.

According to the embodiment as described above, the electronic device 100 according to the disclosure may reconstruct a neural network model having high computational efficiency and high precision by performing the recursive quantization on the weight data according to the optimal iteration count. In other words, the electronic device 100 may perform the recursive quantization process in which quantization is repeated several times with a base bit of low bit instead of performing quantization with one high bit, and accordingly, even hardware supporting single precision may have the same effect as supporting mixed-precision.

Figure 2:
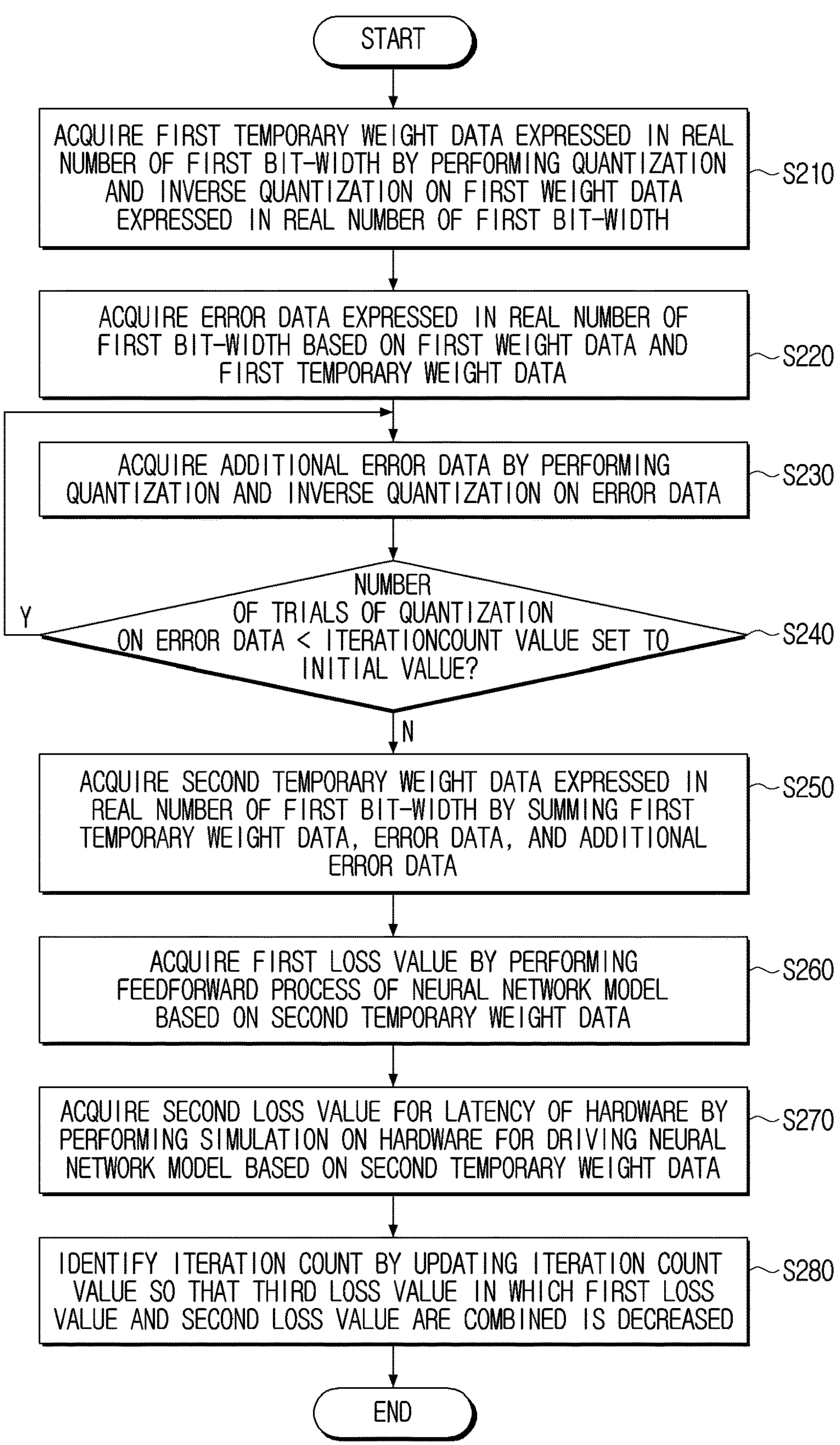
FIG. 2 is a flowchart illustrating in detail a process of identifying an iteration count according to an embodiment of the disclosure.

FIG. 2 is a flowchart illustrating in detail a process of identifying the iteration count according to an embodiment of the disclosure. That is, FIG. 2 is a diagram for explaining in more detail S110 of FIG. 1.

As described above, the electronic device 100 may identify the iteration count of quantization for error data for each of the plurality of layers included in the neural network model based on the first model information. Specifically, the process of identifying the iteration count may be performed by updating the iteration count value set to an initial value. The initial value of the iteration count value may be set to an arbitrary integer or real value. The initial value of the iteration count value may be set by a developer or a user as well as being initialized to an arbitrary value by the electronic device 100. Meanwhile, because the first weight data included in the first model information is used in the process of identifying the iteration count, the description will be made on the assumption that the first weight data is pre-stored in the electronic device 100.

Referring to FIG. 2, the electronic device 100 may acquire first temporary weight data expressed in a real number of a first bit-width by performing quantization and inverse quantization on the first weight data expressed in a real number of the first bit-width (S210). When the first temporary weight data is acquired, the electronic device 100 may acquire error data expressed in a real number of the first bit-width based on the first weight data and the first temporary weight data (S220). In addition, when the error data is acquired, the electronic device 100 may acquire additional error data by performing quantization and inverse quantization on the error data (S230).

That is, each of the quantization of the first weight data and the quantization of the error data may be performed according to a fake quantization technique in which inverse quantization is performed again after quantization. Hereinafter, on the premise that the quantization processes sequentially performed according to the disclosure will be referred to as first quantization, second quantization, and third quantization in order, processes of first quantization, second quantization, and third quantization performed according to the fake quantization technique will be described in detail.

On the other hand, hereinafter, for convenience of description, weight data and error data acquired as a result of quantization and inverse quantization of the first weight data will be referred to as first temporary weight data and first error data, respectively, and additional error data acquired as a result of quantization and inverse quantization by the iteration count for the error data will be referred to as second error data, third error data, and the like according to an acquisition order.

The first quantization may be performed through the following process. The electronic device 100 may acquire weight data expressed in an integer of the second bit-width by performing quantization on the first weight data expressed in a real number of the first bit-width. Thereafter, the electronic device 100 may acquire first temporary weight data expressed in a real number of the first bit-width by performing inverse quantization on the weight data expressed in an integer of the second bit-width and mapping the weight data expressed in the integer of the second bit-width back to the real number value of the first bit-width. Accordingly, the electronic device 100 may acquire first error data representing a difference between the first weight data expressed in the real number of the first bit-width and the first temporary weight data expressed in the real number of the first bit-width as an absolute value. In this case, the first error data is expressed in a real number of the first bit-width.

The second quantization may be performed through the following process. When the first error data is acquired, the electronic device 100 may acquire error data expressed in an integer of the second bit-width by performing quantization on the first error data expressed in a real number of the first bit-width. Thereafter, the electronic device 100 may acquire second error data expressed in a real number of the first bit-width by performing inverse quantization on the error data expressed in the integer of the second bit-width and mapping the error data expressed in the integer of the second bit-width back to the real number value of the first bit-width. In this case, the second error data is expressed in a real number of the first bit-width.

As described above, the performing of inverse quantization again after performing quantization according to the fake quantization technique is to express a difference between data before and after quantization as a real number by converting integer data acquired according to quantization into real number data. In this case, the data acquired according to the results of quantization and inverse quantization results are expressed in the real numbers, but because precision is reduced according to the quantization, a difference may occur between the data before and after the quantization.

As described above, when the first quantization and the second quantization are performed, the electronic device 100 may acquire second temporary weight data to which the results of the first quantization and the second quantization are reflected by summing the first temporary weight data expressed in the real number of the first bit-width, the first error data expressed in the real number of the first bit-width, and the second error data expressed in the real number of the first bit-width. Here, the second temporary weight data refers to temporary weight data applied to the neural network model to update the iteration count value, and may be changed whenever the iteration count value is updated.

On the other hand, the process of acquiring the additional error data by performing the quantization and inverse quantization on the error data may be determined according to whether the number of trials of quantization on the error data reaches the iteration count value set to the initial value.

Specifically, as illustrated in FIG. 2, if the number of trials of quantization on the error data is smaller than the iteration count value set to the initial value (S240-Y), the electronic device 100 may acquire the additional error data by performing the quantization and inverse quantization on the error data again (S230).

For example, when the iteration count value set to the initial value is 2, the following third quantization process may be additionally performed after the first and second quantization processes as described above are performed. Specifically, when the second error data is acquired, the electronic device 100 may acquire error data expressed in an integer of the second bit-width by performing quantization on the second error data expressed in a real number of the first bit-width. Thereafter, the electronic device 100 may acquire third error data expressed in the real number of the first bit-width by performing inverse quantization on the error data expressed in the integer of the second bit-width and mapping the error data expressed in the integer of the second bit-width back to the real number value of the first bit-width. In this case, the third error data is expressed in a real number of the first bit-width.

As described above, when the first quantization, the second quantization, and the third quantization are performed, the electronic device 100 may acquire second temporary weight data to which the results of the first quantization, the second quantization, and the third quantization are reflected by summing the first temporary weight data expressed in the real number of the first bit-width, the first error data expressed in the real number of the first bit-width, the second error data expressed in the real number of the first bit-width, and the third error data expressed in the real number of the first bit-width. In the above description, it was described on the premise that the iteration count value set to the initial value is 3, but if the iteration count set to the initial value is greater than 3, a process such as fourth quantization on the error data may be additionally performed after the first quantization, the second quantization, and the third quantization.

On the other hand, if the number of trials of quantization on the error data is greater than or equal to the iteration count value set to the initial value (S240-N), the electronic device 100 may acquire the second temporary weight data expressed in the real number of the first bit-width by terminating the quantization and inverse quantization of the error data, and summing the first temporary weight data, the error data, and the additional error data acquired up to this point (S250).

Meanwhile, in the above description, the process of acquiring the second temporary weight data by performing recursive quantization on the first weight data by the iteration count value has been described on the premise that the iteration count value set to the initial value is the integer, but the iteration count value set to the initial value may not be the integer.

If the iteration count value set to the initial value is not an integer, the electronic device 100 may acquire third temporary weight data expressed in the real number by performing the recursive quantization as described above according to a first iteration count value acquired by rounding down the iteration count value, and may acquire fourth temporary weight data expressed in the real number by performing the recursive quantization as described above according to a second iteration count value acquired by rounding up the iteration count value. In addition, the electronic device 100 may acquire second temporary weight data by interpolating corresponding weights among the third temporary weight data and the fourth temporary weight data. That is, the electronic device 100 may determine the temporary weight data according to the interpolation result as the second temporary weight data according to the disclosure.

For example, if the iteration count value set to the initial value is 2.5, the electronic device 100 may acquire the third temporary weight data expressed in the real number by performing the recursive quantization according to the disclosure twice, which is the first iteration count acquired by rounding down the iteration count value, and may acquire the fourth temporary weight data expressed in the real number by performing the recursive quantization as many as three times, which is the second iteration count acquired by rounding up the iteration count value. In addition, the electronic device 100 may acquire the second temporary weight data by interpolating corresponding weights among the third temporary weight data and the fourth temporary weight data. As an example, the interpolation of weights may be performed through linear interpolation, but the interpolation method according to the disclosure is not particularly limited.

When the second temporary weight data is acquired through the process as described above, the electronic device 100 may acquire a first loss value by performing a feedforward process of the neural network model based on the second temporary weight data (S260). That is, the electronic device 100 may acquire output data corresponding to the input data based on the second temporary weight data by inputting the input data included in training data to the neural network model, and may acquire the first loss value based on a difference between the acquired output data and correct answer data included in the training data.

Meanwhile, the electronic device 100 may acquire a second loss value for latency of hardware by performing a simulation on hardware for driving the neural network model based on the second temporary weight data (S270). Specifically, the electronic device 100 may acquire information on latency corresponding to a set resource of hardware and a second loss value accordingly by setting the resource of hardware for driving the neural network model and simulating the operation of the neural network model based on the acquired temporary weight data. As an example, when the neural network model is driven using the electronic device 100 according to the disclosure, the simulation as described above may be performed by setting hardware resources of a memory 110 and a processor 120 to be described later. However, the hardware for driving the neural network model is not limited to the hardware of the electronic device 100 according to the disclosure.

When the first loss value and the second loss value are acquired, the electronic device 100 may identify the iteration count by updating an iteration count value so that a third loss value in which the first loss value and the second loss value are combined is decreased (S280). As described above, the process of updating the iteration count value so that the third loss value in which the first loss value and the second loss value are combined is reduced according to the disclosure may be referred to as a process of determining an optimal iteration count in consideration of both the precision of weight data and the latency of hardware.

Specifically, the electronic device 100 may update the iteration count value according to a gradient descent method for reducing a gradient of an activation function for each layer by performing a back propagation process based on the third loss value. In addition, when the iteration count value is updated with a new iteration count value, the electronic device 100 may acquire new second temporary weight data by repeating steps S210, S220, S230, S240, and S250 as described above with the new iteration count value being a set value. Further, when the new second temporary weight data is acquired, the electronic device 100 may update the iteration count value again by repeating steps S260, S270, and S280 as described above.

When the iteration count value is updated enough to converge to a specific value, the electronic device 100 may determine the updated iteration count value as the iteration count value for performing the recursive quantization according to the disclosure. In this case, a rounding-up process for expressing the updated iteration count value as an integer may be additionally performed.

Figure 3:
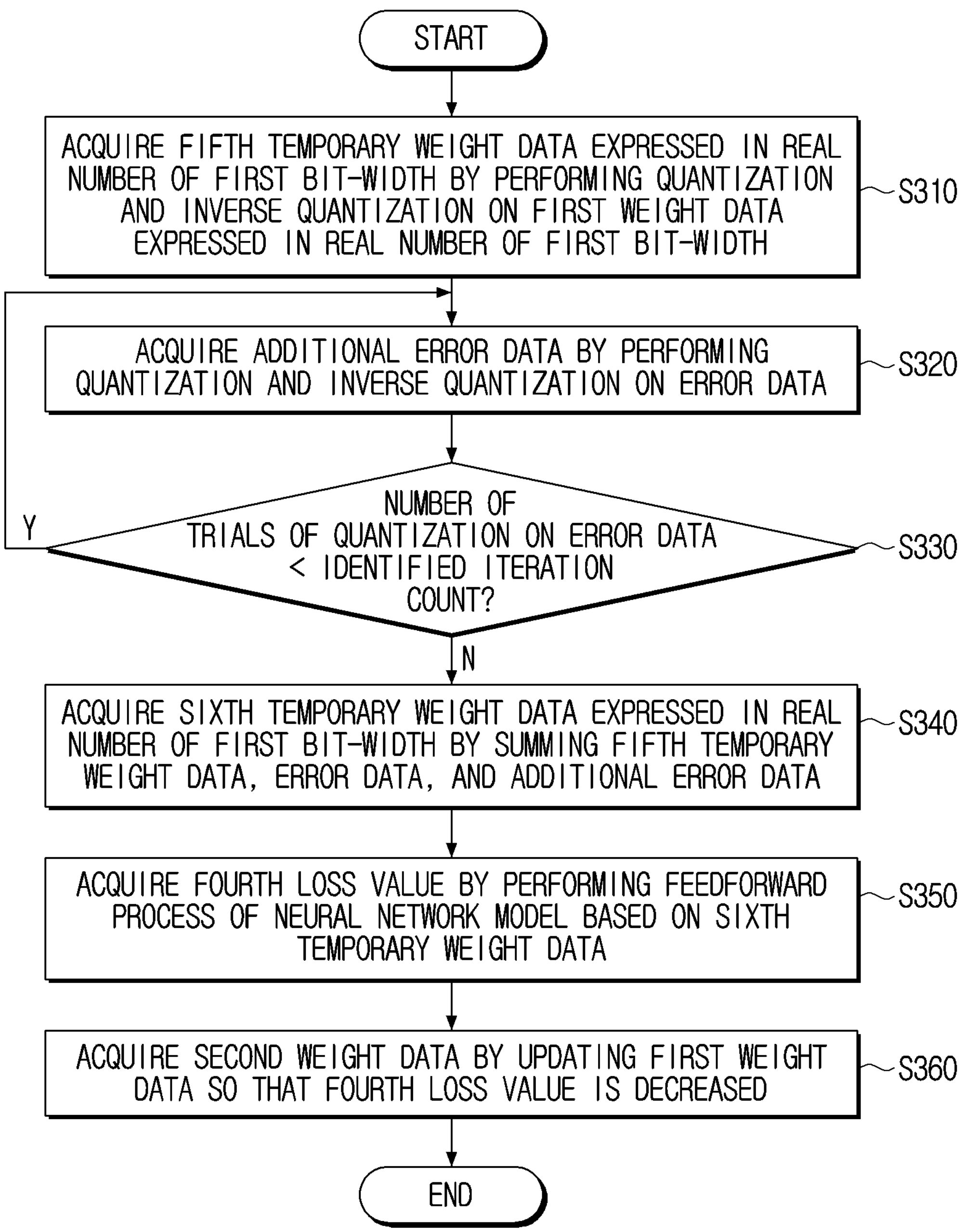
FIG. 3 is a flowchart illustrating in detail a process of acquiring quantization information according to an embodiment of the present disclosure.

FIG. 3 is a flowchart illustrating in detail a process of acquiring quantization information according to an embodiment of the present disclosure. That is, FIG. 3 is a diagram for explaining step S120 of FIG. 1 in more detail.

As described above, when the iteration count for each of the plurality of layers is identified, the electronic device 100 may acquire the quantization information including the second weight data corresponding to each of the first weight data and expressed in the integer of the second bit-width smaller than the first bit by performing the recursive quantization according to the identified iteration count.

Specifically, the electronic device 100 may acquire temporary weight data expressed in the real number of the first bit-width by performing the recursive quantization on the first weight data according to the identified iteration count. When the temporary weight data is acquired, the electronic device may acquire a loss value by performing a feedforward process of the neural network model based on the temporary weight data. When the loss value is acquired, the electronic device 100 may acquire the second weight data by updating the first weight data so that the loss value is decreased.

In particular, the process of acquiring the temporary weight data may be performed according to the fake quantization technique of performing the inverse quantization after quantization as described above with reference to FIG. 2. Hereinafter, for distinction from the terms used in the description of FIG. 2, weight data and error data acquired as a result of quantization and inverse quantization of the first weight data will be referred to as fifth temporary weight data and fourth error data, respectively, and additional error data acquired as a result of quantization and inverse quantization by the iteration count for the error data will be referred to as fifth error data, sixth error data, and the like according to an acquisition order.

Referring to FIG. 3, the electronic device 100 may acquire fifth temporary weight data expressed in a real number of a first bit-width by performing quantization and inverse quantization on the first weight data expressed in the real number of the first bit-width (S310).

Specifically, the electronic device 100 may acquire weight data expressed in an integer of the second bit-width by performing quantization on the first weight data expressed in the real number of the first bit-width. Thereafter, the electronic device 100 may acquire the fifth temporary weight data expressed in the real number of the first bit-width by performing inverse quantization on the weight data expressed in the integer of the second bit-width and mapping the weight data expressed in the integer of the second bit-width back to the real number value of the first bit-width. Accordingly, the electronic device 100 may acquire fourth error data representing a difference between the first weight data expressed in the real number of the first bit-width and the fifth temporary weight data expressed in the real number of the first bit-width as an absolute value. In this case, the fourth error data is expressed in a real number of the first bit-width.

If the fifth temporary weight data is acquired, the electronic device 100 may acquire additional error data by performing quantization and inverse quantization on the error data (S320).

Specifically, when the fourth error data is acquired, the electronic device 100 may acquire error data expressed in an integer of the second bit-width by performing quantization on the fourth error data expressed in a real number of the first bit-width. Thereafter, the electronic device 100 may acquire fifth error data expressed in a real number of the first bit-width by performing inverse quantization on the error data expressed in the integer of the second bit-width and mapping the error data expressed in the integer of the second bit-width back to the real number value of the first bit-width. In this case, the fifth error data is expressed in a real number of the first bit-width.

When the fifth error data is acquired, the electronic device 100 may acquire sixth temporary weight data by summing the fifth temporary weight data expressed in the real number of the first bit-width, the fourth error data expressed in the real number of the first bit-width, and the fifth error data expressed in the real number of the first bit-width. Here, the sixth temporary weight data refers to temporary weight data applied to the neural network model to update the first weight data, and may be changed whenever the iteration count value is updated.

On the other hand, the process of acquiring the additional error data by performing the quantization and inverse quantization on the error data may be determined according to whether the number of trials of quantization on the error data reaches the identified iteration count value.

Specifically, as illustrated in FIG. 3, if the number of trials of quantization on the error data is smaller than the identified set iteration count value (S330-Y), the electronic device 100 may acquire the additional error data by performing the quantization and inverse quantization on the error data again (S320).

On the other hand, if the number of trials of quantization on the error data is greater than or equal to the iteration count value set to the initial value (S330-N), the electronic device 100 may acquire the sixth temporary weight data expressed in the real number of the first bit-width by terminating the quantization and inverse quantization of the error data, and summing the fifth temporary weight data, the error data, and the additional error data.

When the sixth temporary weight data is acquired through the process as described above, the electronic device 100 may acquire a fourth loss value by performing a feedforward process of the neural network model based on the sixth temporary weight data. Here, the term "fourth loss value" is used to distinguish it from the first loss value, the second loss value, and the fourth loss value as defined above, and may have the same properties as the first loss value in that it is a loss value acquired by performing the feedforward process.

If the fourth loss value is acquired, the electronic device 100 may acquire the second weight data by updating the first weight data so that the fourth loss value is decreased (S360). Specifically, the electronic device 100 may update the first weight data according to the gradient descent method of reducing the gradient of the activation function for each layer by performing a back propagation process based on the fourth loss value. In addition, when the first weight data is updated with new weight data, the electronic device 100 may acquire new sixth temporary weight data by repeating steps S310, S320, S330, and S340 as described above based on the new first weight data. Further, when the new sixth temporary weight data is acquired, the electronic device 100 may update the first weight data again by repeating steps S350 and S360 as described above.

When the first weight data is updated enough to converge, the electronic device 100 may determine the updated first weight data as the second weight data that is weight data for performing the model reconfiguration process according to the disclosure. In this case, a rounding-up process for expressing the updated first weight data as an integer may be additionally performed.

Meanwhile, in the above, the process of acquiring the second weight data for performing the model reconfiguration process according to the disclosure by updating the first weight data through the recursive quantization process according to the fake quantization technique has been described above, and the more detailed description of the fake quantization technique has been described above with reference to FIG. 2, and thus a redundant description is omitted.

Figure 4:
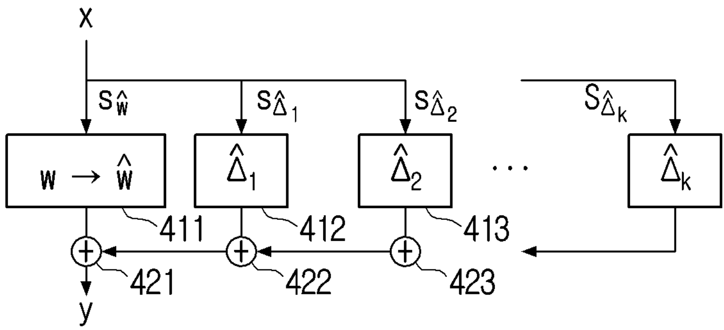
FIG. 4 is a diagram for explaining a process of reconfiguring a neural network model according to an embodiment of the disclosure.

FIG. 4 is a diagram for explaining a process of reconfiguring a neural network model according to an embodiment of the disclosure. That is, FIG. 3 is a diagram for explaining step S130 of FIG. 1 in more detail.

As described above, when the second weight data is acquired, the electronic device 100 may acquire second model information on a reconfigured neural network model by reconfiguring the neural network model based on the first model information, the information on the identified iteration count, and the quantization information.

As described above, the first model information may include information on the plurality of layers of the neural network model and the first weight data. In addition, the information on the plurality of layers may include information on the structure of the plurality of layers and information on at least one operator included in each of the plurality of layers. In addition, as described above, the quantization information may include information on the second weight data, first scale information corresponding to the second weight data, information on error data corresponding to the second weight data, and second scale information corresponding to the error data.

Specifically, the electronic device 100 may combine a plurality of second operators for reflecting the error data with a first operator included in the layer of the neural network model by the number corresponding to the identified iteration count, based on information on a configuration of a plurality of layers included in the first model information and information on operators included in the plurality of layers. Here, the first operator refers to an operator for performing an operation between the input data and the weight data, and the second operator refers to an operator for reflecting the error data to the weight data. Specifically, the plurality of second operators may include an operator for performing an operation between the error data and the second scale information and an operator for summing the operation results.

FIG. 4 illustrates that k operators 411, 412, and 413 for performing an operation between the error data ($\hat{\Delta}_1$, $\hat{\Delta}_2$, . . . , $\hat{\Delta}_k$) and the second scale information ($s_{\hat{\Delta}_1}$, $s_{\hat{\Delta}_2}$, . . . , $s_{\hat{\Delta}_k}$) may be added in parallel to the first operator 411 for performing an operation between the input data (x) and the weight data (w, $\hat{w}$), and k−1 operators 421, 422, and 423 for summing the operation results may be further added thereto. Here, y denotes output data, and k is a natural number corresponding to the identified iteration count.

As described above, when the configuration of the layer is changed, the electronic device 100 may allocate quantized parameters to each operator of the changed layer. Specifically, the electronic device 100 may allocate the information on the second weight data and the first scale information to the first operator, and allocate the information on the error data and the second scale information to the plurality of second operators. Accordingly, the electronic device 100 may acquire second model information, which is information on the reconfigured neural network model.

Referring to FIG. 4, the electronic device 100 may change first weight data (w) of the first operator to quantized second weight data ($\hat{w}$) (that is, $w \rightarrow \hat{w}$) and allocate first scale information ($s_{\hat{w}}$) to the first operator 411. In addition, the electronic device 100 may allocate error data ($\hat{\Delta}_1$, $\hat{\Delta}_2$, . . . , $\hat{\Delta}_k$) and second scale information ($s_{\hat{\Delta}_1}$, $s_{\hat{\Delta}_2}$, . . . , $s_{\hat{\Delta}_k}$) corresponding to the k operators 411, 412, and 413 to each of the k operators 411, 412, and 413 for performing an operation between the error data ($\hat{\Delta}_1$, $\hat{\Delta}_2$, . . . , $\hat{\Delta}_k$) and the second scale information ($s_{\hat{\Delta}_1}$, $s_{\hat{\Delta}_2}$, . . . , $s_{\hat{\Delta}_k}$).

In other words, before the reconfiguration process of the neural network model according to the disclosure is performed, when the input data is input to a specific layer including the first operator, the first operator may output the output data by performing an operation between the input data and the first weight data. However, when the reconfiguration process of the neural network model according to the disclosure is performed, the layer included in the reconfigured neural network model may output the output data for the input data based on the second weight data, the first scale information, the error data, and the second scale information that are allocated parameters through the first operator and the plurality of second operators.

Meanwhile, a process of acquiring the output data for the input data using the reconfigured neural network model may be performed according to an operation process based on Mathematical expressions 1 to 5 below.

$$s = \frac{\max - \min}{2^n - 1}, \quad zp = -\frac{\min}{s} \qquad \text{[Mathematical expression 1]}$$

Mathematical expression 1 is an expression illustrating a definition of scale information (s) and a definition of a zero point (zp). In Mathematical expression 1, max denotes an upper limit value of real weight data, min denotes a lower limit value of real weight data, and n denotes a base bit. Here, the base bit refers to a basic unit of bits that may be expressed by the neural network model.

Referring to Mathematical expression 1, the scale information is defined as a value obtained by dividing a range of real weight data specified by the upper limit value and the lower limit value by the number of integer values specified according to the base bit. In addition, the zero point refers to a value obtained by dividing the lower limit of the real weight data by the scale information and then taking a negative number.

$$r = s(q - zp) \qquad \text{[Mathematical expression 2]}$$

Mathematical expression 2 is an expression representing a relationship between a real value (r) and an integer value (q) using the scale information and the zero point when an integer value is acquired by quantizing the real value. That is, a relationship of a linear function with a slope of s and an intercept of zp may be established between the real value and the integer value. The variable name of the intercept is "zp."

$$r_o = r_w * r_i \qquad \text{[Mathematical expression 3]}$$

Mathematical expression 3 is an expression representing a relationship between the input data ($r_i$), the weight data ($r_w$) and the output data ($r_o$). Here, an operation symbol (*) may mean a convolution operation, but there is no particular limitation on the type of operation according to the disclosure.

$$s_o(q_o - zp_o) = s_w(q_w - zp_w) * s_i(q_i - zp_i) \qquad \text{[Mathematical expression 4]}$$

Mathematical expression 4 is an expression representing a relationship between scale information for input data, scale information for weight data, and scale information for output data. Here, a subscript (i) denotes the input data, a subscript (o) denotes the output data, and a subscript (w)

denotes the weight data, respectively. Specifically, using Mathematical expressions 2 and 3, a relational expression such as Mathematical expression 4 is derived.

$$q_o = \frac{s_w s_i}{s_o}(q_w - zp_w) * (q_i - zp_i) + zp_o \quad \text{[Mathematical expression 5]}$$

Mathematical expression 5 is an expression representing a process of acquiring quantized output data based on quantized input data and quantized weight data. Specifically, if the expressions are sorted based on the quantized output data by using Mathematical expressions 3 and 4, a relational expression such as Mathematical expression 5 is derived.

In conclusion, according to the operation process as described with reference to Mathematical expressions 1 to 5, the quantized output data may be acquired based on the quantized input data and the quantized weight data.

According to an embodiment of the disclosure, when output data of a specific layer is transmitted to the next layer, the output data may be expressed in a real number and transmitted. That is, the quantized output data may be inverse-quantized and then transmitted to a next layer, and the inverse quantized output data may be quantized again in the next layer to be used as input data.

However, when the output data of the specific layer is transmitted to the next layer, the output data is not necessarily expressed in the real number and transmitted. That is, according to an embodiment of the disclosure, the quantization output value of the specific layer (i.e., the input value of the next layer) and the output scale (i.e., the input scale of the next layer) may be transmitted together and reflected internally through a compound scale $$\left(\frac{s_w s_i}{s_0}\right)$$

during convolution or linear operation in the next layer. As such, if an end-to-end integer operation is performed without inverse quantization process in the middle, there is an advantage that latency of hardware may be significantly reduced.

Figure 5:
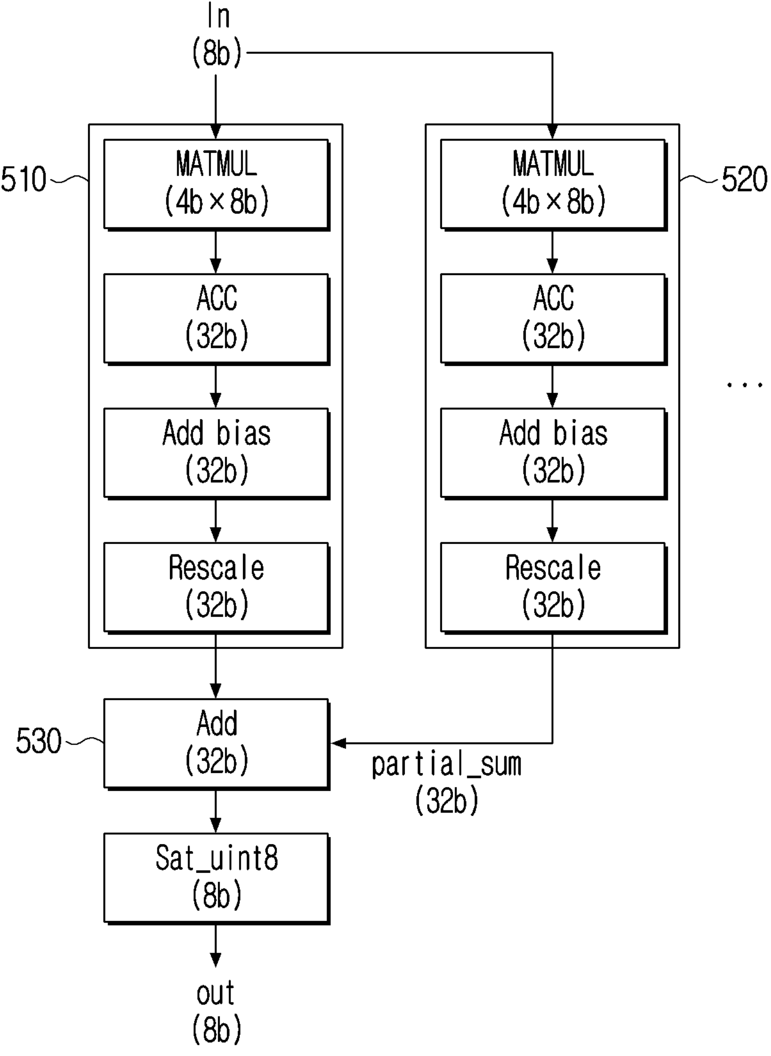
FIG. 5 is a diagram for explaining a hardware component for performing recursive quantization according to the disclosure.

FIG. 5 is a diagram for explaining a component of hardware for performing recursive quantization according to the disclosure.

A hardware architecture as illustrated in FIG. 5 exemplarily illustrates typical hardware components for performing a convolution operation and an architecture of the hardware components.

As illustrated in FIG. 5, the hardware component according to an embodiment of the disclosure may include a plurality of convolution operators 510 and 520 and a summation operator 530. Here, each of the plurality of convolution operators 510 and 520 may acquire a partial sum of the input data through a plurality of modules as exemplarily illustrated in FIG. 5, and the summation operator 530 may acquire output data by summing the partial sums. FIG. 5 illustrates the first convolution operator 510 and the second convolution operator 520, which are two operators among the plurality of convolution operators 510 and 520, but this is only for simplified illustration, and more convolution operators may be arranged in parallel depending on the size of the input data.

Specifically, when the input data is input to the first convolution operator 510, the first convolution operator 510 may perform a multiplication operation between a matrix representing the input data and a matrix representing the weight data through a matrix multiplication module (MATMUL), and may accumulate multiplication operation results through an accumulation (ACC) module. In addition, the first convolution operator 510 may acquire a first intermediate value by correcting a deviation of the multiplication operation results through an Add Bias module and adjusting a scale through a Rescale module.

When a second intermediate value is acquired through the second convolution operator 520 similarly to the process of acquiring the first intermediate value through the first convolution operator 510, the summation operator 530 may acquire a result value obtained by summing the first intermediate value and the second intermediate value. Meanwhile, Sat_unit8 of FIG. 5 exemplarily illustrates an operator for converting the result value into 8 bits and outputting the converted value.

As described above, the hardware capable of performing the convolution operation may include the plurality of parallel convolution operators 510 and 520, and may also include the summation operator 530 capable of performing the partial sum for the intermediate values. Therefore, the hardware component as illustrated in FIG. 5 may be used for recursive quantization according to the disclosure.

Specifically, the plurality of convolution operators 510 and 520 arranged in parallel in the hardware component may correspond to the operators 412 and 413 for performing an operation between the error data and the second scale information on the first operator among the first operator 411 and the plurality of second operators as illustrated in FIG. 4, and the summation operator 530 disposed between the plurality of convolution operators in the hardware component may correspond to the operators 421, 422, and 423 for summing the operation results as illustrated in FIG. 4.

In other words, the operators for performing the recursive quantization according to the disclosure may be implemented using a hardware component for a typical convolution operation as illustrated in FIG. 5.

Figure 6:
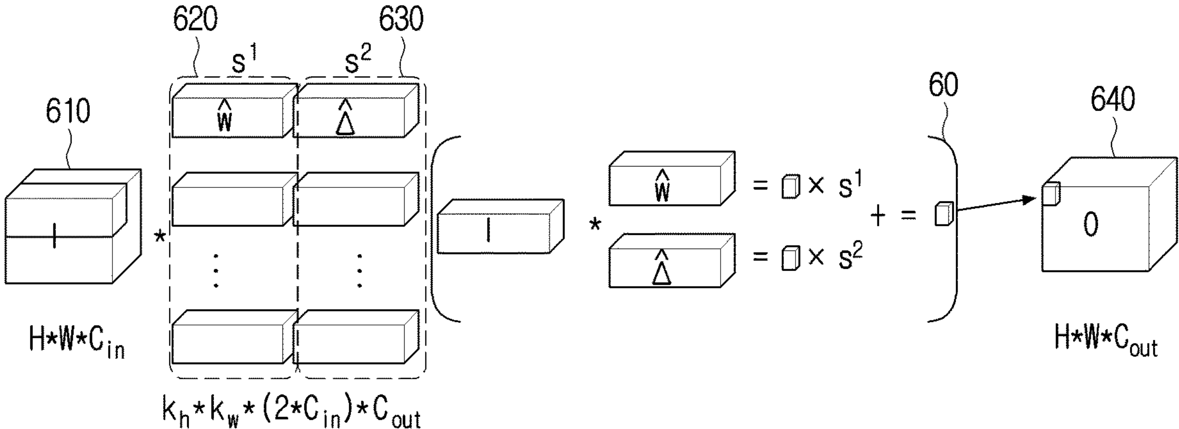
FIG. 6 is a diagram for explaining a process of performing a convolution operation according to an embodiment of the disclosure.

FIG. 6 is a diagram for explaining a process of performing a convolution operation according to an embodiment of the disclosure.

As illustrated in FIG. 6, input data 610 used for the convolution operation may be defined as a matrix having a size according to a height (H), a width (W), and a channel ($C_{in}$). In addition, weight data 620 and 630 used for the convolution operation may be defined as a matrix having a size according to a height ($K_h$), a width ($K_w$), and a channel ($C_{in}$) of the input data and a channel ($C_{out}$) of the output data. In addition, output data 640 may be defined as a matrix having a size according to the height (H), the width (W), and the channel ($C_{out}$) of the output data. In the disclosure, the term "channel" may be replaced with the term "depth".

According to an embodiment of the disclosure, the weight data according to the disclosure may be constructed as integrated data in a form in which the quantized weight data 620 and the quantized error data 630 are combined. Specifically, as illustrated in FIG. 6, the weight data according to the disclosure may be constructed so that the quantized weight data 620 and the quantized error data 630 are combined to have a double channel ($2*C_{in}$) of the channel ($C_{in}$) of the input data, as if it is one weight data.

In this case, the electronic device 100 may acquire the output data 640 by performing an operation between the input data 610 and the integrated data through one operator. Specifically, the electronic device 100 may acquire one output data by performing an operation between the quantized weight data ($\hat{w}$) among the integrated data and the input data 610, and then multiplying a corresponding scale ($s^1$) thereto, performing an operation between the quantized error data ($\hat{\Delta}$) among the integrated data and the input data 610, and then multiplying a corresponding scale ($s^2$) thereto, and summing the multiplication operation results, through one operator 60.

In particular, when the hardware for performing the operation between the weight data among the integrated data and the input data, and the hardware for performing the operation between the error data among the integrated data and the input data are separately implemented, the speed and efficiency of the convolution operation using the integrated data as illustrated in FIG. 6 may be significantly improved.

Figure 7:
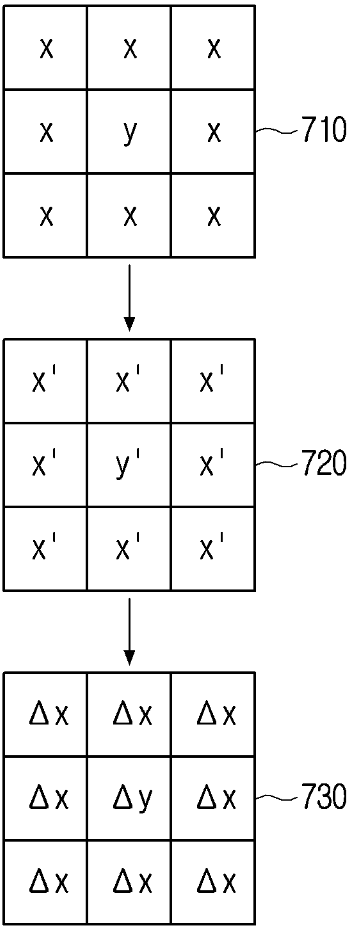
FIG. 7 is a diagram for explaining a recursive quantization process for a weight of a filter for edge detection according to an embodiment of the disclosure.

FIG. 7 is a diagram for explaining a recursive quantization process for a weight of a filter for edge detection according to an embodiment of the disclosure.

There is no particular limitation on weight data to be subjected to the recursive quantization according to the disclosure, and for example, the recursive quantization process according to the disclosure may also be performed on weight data constituting a filter for detecting an edge included in an image.

First, a first matrix of FIG. 7 illustrates a filter including weight values before the quantization process according to the disclosure is performed. According to an embodiment, the filter may be a zero-sum filter having a characteristic that the total sum of weight values constituting the filter becomes 0. For example, when the filter is a Laplacian filter, which is an example of the zero-sum filter, values of x among weight values may be −1 and a value of y may be 8 as in the first matrix of FIG. 7.

However, when quantization is performed on weight data including the weight values of the first matrix of FIG. 7, an error may occur between weight values before and after quantization. When the error occurs between the weight values before and after quantization, the total sum of the quantized weight values may become non-zero, so that the filter including the quantized weight values may lose characteristics as the zero-sum filter. For example, the total sum of weight values of a second matrix of FIG. 7, i.e., $8x'+y'$ may not converge to 0 due to the error caused by quantization.

However, when an additional quantization process is performed on the error data according to the recursive quantization process according to the disclosure and the error data is reflected to the weight values quantized accordingly, the total sum of the quantized weight values may converge to zero. That is, as illustrated in a third matrix of FIG. 7, when quantization on the quantized weight data is performed as many times as the identified iteration count and the result ($\Delta x, \Delta y$) is reflected to the quantized weight data, the total sum of the quantized weight values may converge to zero, and accordingly, the characteristic as the zero-sum filter may be maintained.

Figure 8:
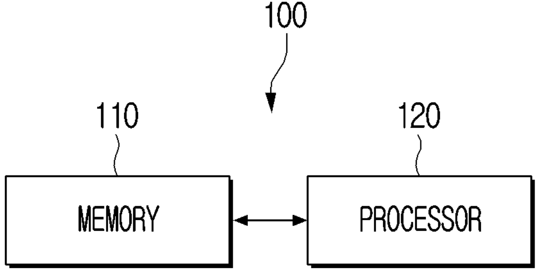
FIG. 8 is a block diagram schematically illustrating a hardware component according to an embodiment of the disclosure.
Figure 9:
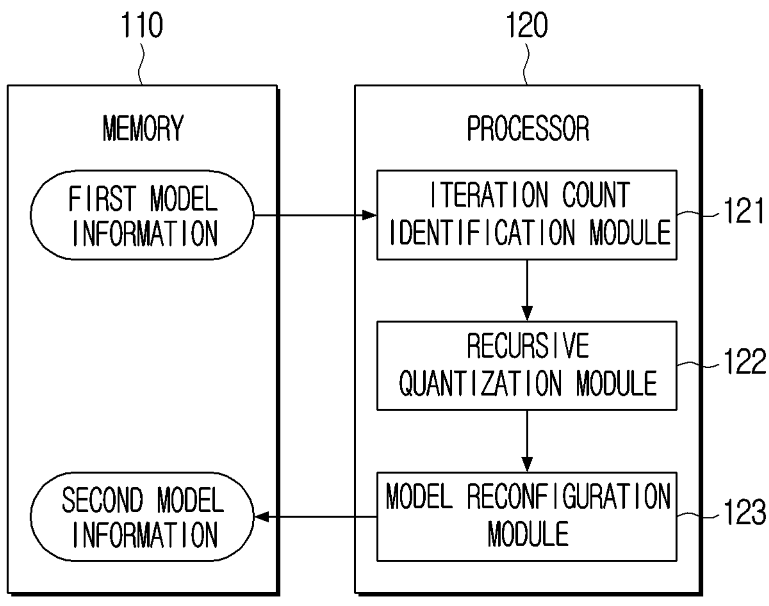
FIG. 9 is a block diagram illustrating a software module coupled to the hardware component according to an embodiment of the disclosure.

FIG. 8 is a block diagram schematically illustrating a hardware component according to an embodiment of the disclosure, and FIG. 9 is a block diagram illustrating a software module coupled to the hardware component according to an embodiment of the disclosure.

As illustrated in FIG. 8, the electronic device 100 according to an embodiment of the disclosure includes a memory and a processor. In addition, as illustrated in FIG. 9, the processor according to the disclosure may implement diverse embodiments according to the disclosure using software modules such as an iteration count identification module, a recursive quantization module, and a model reconfiguration module. However, the components as illustrated in FIGS. 8 and 9 are merely examples, and in implementing the disclosure, a new component may be added or some components may be omitted in addition to the components as illustrated in FIGS. 8 and 9.

One or more instructions regarding the electronic device 100 may be stored in the memory. In addition, the memory may store an operating system (O/S) for driving the electronic device 100. In addition, the memory may also store various software programs or applications for operating the electronic device 100 according to diverse embodiments of the disclosure. In addition, the memory may include a semiconductor memory such as a flash memory or the like, or a magnetic storage medium such as a hard disk or the like.

Specifically, the memory may store various software modules for operating the electronic device 100 according to diverse embodiments of the disclosure, and the processor may execute the various software modules stored in the memory to control an operation of the electronic device 100. That is, the memory may be accessed by the processor, and readout, writing, correction, deletion, updating, and the like of data in the memory may be performed by the processor.

On the other hand, in the disclosure, the term memory may be used as a meaning including a memory, a read only memory (ROM) (not illustrated) in the processor, a random access memory (RAM) (not illustrated), or a memory card (not illustrated) (e.g., a micro secure digital (SD) card or a memory stick) mounted in the electronic device 100.

In particular, in the diverse embodiments according to the disclosure, various information such as the first model information including the first weight data, the second model information including the second weight data, the quantization information, the information on the set iteration count, the information on the iteration count identified according to the disclosure, the information on the loss value according to the feedforward process, the information on the loss values according to the simulation results for the hardware, and the like may be stored in the memory.

In addition, various information necessary within the scope for achieving the purpose of the disclosure may be stored in the memory, and the information stored in the memory may also be updated as being received from the external device or being input by the user.

The processor controls an overall operation of the electronic device 100. Specifically, the processor may be connected to the components of the electronic device 100 including the memory, and may execute one or more instructions stored in the memory as described above to control the overall operation of the electronic device 100.

The processor may be implemented in various manners. For example, the processor may be implemented as at least one of an application specific integrated circuit (ASIC), an embedded processor, a microprocessor, a hardware control logic, a hardware finite state machine (FSM), or a digital signal processor (DSP). On the other hand, in the disclosure, the term processor may be used as a meaning including a central processing unit (CPU), a graphic processing unit (GPU), a main processing unit (MPU), and the like.

In particular, in the diverse embodiments according to the disclosure, the processor may implement the diverse embodiments according to the disclosure by using the software modules such as the iteration count identification module, the recursive quantization module, and the model reconfiguration module.

The processor may identify the iteration count of quantization for error data for each of the plurality of layers included in the neural network model based on the first model information through the iteration count identification module.

The "iteration count identification module" refers to a module capable of identifying the iteration count of quantization for error data according to the disclosure. Specifically, when information on the plurality of layers of the neural network model and first weight data expressed in a real number of a first bit-width included in the first model information are input, the iteration count identification module may identify the iteration count of quantization for error data that may acquire optimal quantized weight data for each of the plurality of layers.

When the iteration count for each of the plurality of layers is identified, the processor may acquire quantization information including second weight data corresponding to each of the first weight data and expressed in an integer of a second bit-width smaller than the first bit by performing the recursive quantization according to an iteration count according to an output of the iteration count identification module, through the recursive quantization module.

The "recursive quantization module" refers to a module capable of performing quantization on first weight data and quantization on error data. Specifically, the recursive quantization module may acquire quantization information according to the disclosure by performing quantization on the first weight data and performing quantization on the error data according to the quantization result on the first weight data by the identified iteration count according to the fake quantization technique of performing inverse quantization again after quantization.

When the quantization information is acquired, the processor may acquire second model information on a reconfigured neural network model by reconfiguring the neural network model based on the first model information, the information on the identified iteration count, and the quantization information, through the model reconfiguration module.

The "model reconfiguration module" refers to a module capable of reconfiguring the architecture and parameters of the neural network model based on the result of recursive quantization according to the disclosure. Specifically, the model reconfiguration module may acquire the second model information by reconfiguring the neural network model based on the iteration count according to the output of the iteration count identification module and the quantization information according to the output of the recursive quantization module.

The diverse embodiments according to the disclosure based on the control of the processor have been described above with reference to FIGS. 1 to 7, and thus redundant descriptions will be omitted.

On the other hand, the controlling method of the electronic device 100 according to the embodiment described above may be implemented by a program and provided to the electronic device 100. In particular, the program including the controlling method of the electronic device 100 may be stored in a non-transitory computer readable medium and provided.

Specifically, in a non-transitory computer readable recording medium including a program for executing a controlling method of the electronic device 100, the controlling method of the electronic device 100 includes identifying an iteration count of quantization for error data for each of a plurality of layers based on first model information including information on the plurality of layers of a neural network model and first weight data expressed in a real number of a first bit-width; acquiring quantization information including second weight data corresponding to each of the first weight data and expressed in an integer of a second bit-width smaller than the first bit by performing the recursive quantization according to the identified iteration count; and acquiring second model information on a reconfigured neural network model by reconfiguring the neural network model based on the first model information, information on the identified iteration count, and information on the second weight data.

In the above, the controlling method of the electronic device 100 and the computer readable recording medium including the program that executes the controlling method of the electronic device 100 have been briefly described, but this is merely to omit the redundant descriptions, and the diverse embodiments of the electronic device 100 may also be applied to the controlling method of the electronic device 100 and the computer readable recording medium including the program that executes the controlling method of the electronic device 100.

Meanwhile, the functions related to the neural network models as described above may be performed through the memory and the processor.

The processor may be configured as one or a plurality of processors. Here, one or the plurality of processors may be a general-purpose processor such as a CPU, an AP, or the like, a graphic-dedicated processor such as a GPU, a VPU, or the like, or an artificial intelligence dedicated process such as an NPU.

One or the plurality of processors perform a control to process input data according to predefined operating rules or artificial intelligence models stored in the non-volatile memory and the volatile memory. The predefined operating rules or artificial intelligence models are characterized by being created through training.

Here, "created through training" refers to the predefined operating rules or artificial intelligence models of desired characteristics created by applying learning algorithms to a large number of learning data. Such training may be performed in a device itself in which the artificial intelligence according to the disclosure is performed, or may also be performed through a separate server/system.

The artificial intelligence model may include a plurality of neural network layers. Each layer has a plurality of weight values, and a layer calculation is performed by calculating a calculation result of a previous layer and the plurality of weight values. Examples of the neural network include a convolutional neural network (CNN), a deep neural network (DNN), a recurrent neural network (RNN), a restricted boltzmann machine (RBM), a deep belief network (DBN), a bidirectional recurrent deep neural network (BRDNN), generative adversarial networks (GAN), and deep Q-networks, and the neural network in the disclosure is not limited to the examples described above except as otherwise specified.

The learning algorithm is a method of training a predetermined target device (e.g., a robot) using a large number of learning data so that the predetermined target device may make a decision or predict itself. Examples of the learning algorithm include supervised learning, unsupervised learning, semi-supervised learning, or reinforcement learning, and the learning algorithm in the disclosure is not limited to the examples described above except for the case in which it is specified.

The machine readable storage medium may be provided in the form of non-transitory storage medium. Here, the term "non-transitory storage medium" simply means that the storage medium is a tangible device and does not contain signals (e.g., electromagnetic waves), and such a term does not distinguish between a case where data is stored semi-permanently in the storage medium and a case where data is temporarily stored in the storage medium. For example, the "non-transitory storage medium" may include a buffer in which the data is temporarily stored.

According to an embodiment, the method according to the diverse embodiments disclosed in the disclosure may be included and provided in a computer program product. The computer program product may be traded as a product between a seller and a purchaser. The computer program product may be distributed in the form of a machine-readable storage medium (e.g., compact disc read only memory (CD-ROM)), or may be distributed (e.g., downloaded or uploaded) online, through an application store (e.g., Play Store™) or directly between two user devices (e.g., smartphones). In the case of the online distribution, at least a portion of the computer program product (e.g., a downloadable app) may be at least temporarily stored in a machine readable storage medium such as a memory of a server of a manufacturer, a server of an application store, or a relay server, or may be temporarily generated.

Each of the components (e.g., modules or programs) according to the diverse embodiments as described above may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration.

The operations performed by the module, the program, or other component according to the diverse embodiments may be performed in a sequential, parallel, iterative, or heuristic manner, or at least some operations may be executed in a different order or omitted, or other operations may be added.

On the other hand, the term "~ or" or "module" used in the disclosure includes a unit composed of hardware, software, or firmware, and may be used interchangeably with the term such as logic, logic block, component, or circuit. The "~ or" or "module" may be an integrally formed component or a minimum unit of performing one or more functions or a portion thereof. For example, the module may be configured as an application-specific integrated circuit (ASIC).

The diverse embodiments of the disclosure may be implemented by software including instructions that are stored in machine (e.g., a computer)-readable storage media. The machine is a device that invokes the stored instructions from the storage medium and is operable according to the called instruction, and may include the electronic device (e.g., the electronic device 100) according to the disclosed embodiments.

When the instructions are executed by the processor, the processor may perform functions corresponding to the instructions, either directly or using other components under the control of the processor. The instructions may include codes generated or executed by a compiler or an interpreter.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:

a memory configured to store first model information including information on a plurality of layers of a neural network model and first weight data expressed in a first bit-width; and a processor configured to:

identify an iteration count of quantization of error data for each layer of the plurality of layers, based on the first model information and an iteration-related loss value, acquire quantization information including second weight data corresponding to each of the first weight data and expressed in an integer of a second bit-width smaller than the first bit-width by performing recursive quantization according to the iteration count, and acquire second model information on a reconfigured neural network model by reconfiguring the neural network model based on the first model information, the iteration count, and the second weight data;

acquire temporary weight data expressed in the first bit-width by performing the recursive quantization on the first weight data according to an initial iteration count, acquire a first loss value by performing a feedforward process of the neural network model based on the temporary weight data, acquire a second loss value for latency of hardware by performing a simulation on the hardware for driving the neural network model based on the temporary weight data, and identify the iteration count by updating a current iteration count such that a third loss value is decreased, wherein the third loss value is a combination of the first loss value and the second loss value, wherein the third loss value is the iteration-related loss value, acquire first temporary weight data expressed in the first bit-width by performing first quantization including a quantization and an inverse quantization of the first weight data expressed in the first bit-width, acquire first error data expressed in the first bit-width based on the first weight data and the first temporary weight data expressed in the first bit-width, acquire second error data expressed in the second bit-width by performing second quantization including a quantization and an inverse quantization of the first error data expressed in the first bit-width, determine, as the temporary weight data, second temporary weight data by summing the first temporary weight data, the first error data, and the second error data, acquire third temporary weight data expressed in the first bit-width by performing the recursive quantization on the first weight data according to a first iteration count value acquired by rounding down the current iteration count, and acquire fourth temporary weight data expressed in the first bit-width by performing the recursive quantization on the first weight data according to a second iteration count acquired by rounding up the current iteration count, when the current iteration count is not an integer, interpolate weights corresponding to each other among the third temporary weight data and the fourth temporary weight data, and determine temporary weight data acquired according to a result of the interpolation as the second temporary weight data.

2. The electronic device as claimed in claim 1, wherein the processor is further configured to:

acquire temporary weight data expressed in the first bit-width by performing the recursive quantization on the first weight data according to the iteration count, acquire a loss value by performing a feedforward process of the neural network model based on the temporary weight data, and acquire the second weight data by updating the first weight data so that the loss value is reduced.

3. The electronic device as claimed in claim 1, wherein the quantization information includes first information on the second weight data, first scale information corresponding to the second weight data, second information on second error data corresponding to the second weight data, and second scale information corresponding to the second error data, and the processor is further configured to acquire the second model information by:

allocating the information on the second weight data and the first scale information to a first operator, and allocating the information on the second error data and the second scale information to a plurality of second operators.

4. The electronic device as claimed in claim 1, wherein the first weight data is implemented through a zero-sum filter having a characteristic that a total sum of first weight values constituting the zero-sum filter is 0, and when the recursive quantization is performed according to the iteration count, an error value corresponding to each of the first weight values is reflected to a quantization result of each of the first weight values, such that the total sum converges to 0.

5. The electronic device according to claim 1, wherein the reconfiguring the neural network model based on the first model information includes adding one or more operators to at least one layer of the plurality of layers of the neural network model.

6. The electronic device according to claim 4, wherein the zero-sum filter is a Laplacian filter.

7. A controlling method of an electronic device, the controlling method comprising:

identifying, based on an iteration-related loss value, an iteration count of quantization for error data for each of a plurality of layers, based on first model information including information on the plurality of layers of a neural network model and first weight data expressed in a first bit-width;

acquiring quantization information including second weight data corresponding to each of the first weight data and expressed in a second bit-width smaller than the first bit-width by performing recursive quantization according to the iteration count; and acquiring second model information on a reconfigured neural network model by reconfiguring the neural network model based on the first model information, the iteration count, and the second weight data, wherein the identifying of the iteration count includes:

acquiring temporary weight data expressed in the first bit-width by performing the recursive quantization on the first weight data according to an initial iteration count;

acquiring a first loss value by performing a feedforward process of the neural network model based on the temporary weight data;

acquiring a second loss value for latency of hardware by performing a simulation on the hardware for driving the neural network model based on the temporary weight data; and identifying the iteration count by updating a current iteration count such that a third loss value is decreased, wherein the third loss value is a combination of the first loss value and the second loss value, wherein the third loss value is the iteration-related loss value, wherein the acquiring of the temporary weight data comprises:

acquiring first temporary weight data expressed in the first bit-width by performing first quantization including a quantization and an inverse quantization of the first weight data expressed in the first bit-width, acquiring first error data expressed in the first bit-width based on the first weight data and the first temporary weight data expressed in the first bit-width, acquiring second error data expressed in the second bit-width by performing second quantization including a quantization and an inverse quantization of the first error data expressed in the first bit-width, determining, as the temporary weight data, second temporary weight data by summing the first temporary weight data, the first error data, and the second error data, acquiring third temporary weight data expressed in the first bit-width by performing the recursive quantization on the first weight data according to a first iteration count acquired by rounding down the current iteration count, and acquiring fourth temporary weight data expressed in the first bit-width by performing the recursive quantization on the first weight data according to a second iteration count acquired by rounding up the current iteration count, when the iteration count is not an integer;

interpolating weights corresponding to each other among the third temporary weight data and the fourth temporary weight data; and determining temporary weight data acquired according to a result of the interpolation as the second temporary weight data.

8. The controlling method as claimed in claim 7, wherein the acquiring quantization information further comprises:

acquiring temporary weight data expressed in the first bit-width by performing the recursive quantization on the first weight data according to the iteration count, acquiring a loss value by performing a feedforward process of the neural network model based on the temporary weight data, and acquiring the second weight data by updating the first weight data so that the loss value is reduced.

9. The controlling method as claimed in claim 7, wherein the quantization information includes first information on the second weight data, first scale information corresponding to the second weight data, second information on second error data corresponding to the second weight data, and second scale information corresponding to the error data, and the acquiring of the second model information further comprises:

allocating the information on the second weight data and the first scale information to a first operator, and allocating the information on the second error data and the second scale information to a plurality of second operators.

10. The controlling method as claimed in claim 7, wherein the first weight data is implemented through a zero-sum filter having a characteristic that a total sum of first weight values constituting the zero-sum filter becomes 0, and when the recursive quantization is performed according to the iteration count, an error value corresponding to each of the first weight values is reflected to a quantization result of each of the first weight values, such that the total sum converges to 0.

11. A non-transitory computer readable recording medium including a program for executing a controlling method of an electronic device, wherein the controlling method of the electronic device includes:

identifying an iteration count of quantization for error data for each of a plurality of layers, based on first model information and an iteration-related loss value, including information on the plurality of layers of a neural network model and first weight data expressed in a first bit-width;

acquiring quantization information including second weight data corresponding to each of the first weight data and expressed in a second bit-width smaller than the first bit-width by performing recursive quantization according to the iteration count; and acquiring second model information on a reconfigured neural network model by reconfiguring the neural network model based on the first model information, the iteration count, and the second weight data, wherein the identifying of the iteration count includes:

acquiring temporary weight data expressed in the first bit-width by performing the recursive quantization on the first weight data according to an initial iteration count;

acquiring a first loss value by performing a feedforward process of the neural network model based on the temporary weight data;

acquiring a second loss value for latency of hardware by performing a simulation on the hardware for driving the neural network model based on the temporary weight data; and identifying the iteration count by updating a current iteration count such that a third loss value is decreased, wherein the third loss value is a combination of the first loss value and the second loss value, wherein the third loss value is the iteration-related loss value, wherein the acquiring of the temporary weight data comprises:

acquiring first temporary weight data expressed in the first bit-width by performing first quantization including a quantization and an inverse quantization of the first weight data expressed in the first bit-width, acquiring first error data expressed in the first bit-width based on the first weight data and the first temporary weight data expressed in the first bit-width, acquiring second error data expressed in the second bit-width by performing second quantization including a quantization and an inverse quantization of the first error data expressed in the first bit-width, determining, as the temporary weight data, second temporary weight data by summing the first temporary weight data, the first error data, and the second error data, acquiring third temporary weight data expressed in the first bit-width by performing the recursive quantization on the first weight data according to a first iteration count acquired by rounding down the current iteration count, and acquiring fourth temporary weight data expressed in the first bit-width by performing the recursive quantization on the first weight data according to a second iteration count acquired by rounding up the current iteration count, when the iteration count is not an integer;

interpolating weights corresponding to each other among the third temporary weight data and the fourth temporary weight data; and determining temporary weight data acquired according to a result of the interpolation as the second temporary weight data.

* * * * *